United States Patent
Martin et al.

(10) Patent No.: US 9,825,792 B2
(45) Date of Patent: Nov. 21, 2017

(54) RADIO TRANSMISSION METHOD AND ADAPTED RADIO TRANSMITTER

(71) Applicant: TELECOM DESIGN, Canejan (FR)

(72) Inventors: Eric Martin, Bordeaux (FR); Didier Filhol, Talence (FR)

(73) Assignee: TELECOM DESIGN (FR)

( * ) Notice: Subject to any disclaimer, the term of this patent is extended or adjusted under 35 U.S.C. 154(b) by 189 days.

(21) Appl. No.: 14/428,409

(22) PCT Filed: Feb. 15, 2013

(86) PCT No.: PCT/EP2013/053122
§ 371 (c)(1),
(2) Date: Sep. 25, 2015

(87) PCT Pub. No.: WO2013/121020
PCT Pub. Date: Aug. 22, 2013

(65) Prior Publication Data
US 2016/0013960 A1 Jan. 14, 2016

(30) Foreign Application Priority Data
Feb. 16, 2012 (FR) ..................... 12 51447

(51) Int. Cl.
*H04L 27/20* (2006.01)
*H04L 27/12* (2006.01)
*H04L 27/34* (2006.01)

(52) U.S. Cl.
CPC ........ *H04L 27/2017* (2013.01); *H04L 27/122* (2013.01); *H04L 27/2014* (2013.01); *H04L 27/2057* (2013.01); *H04L 27/34* (2013.01)

(58) Field of Classification Search
CPC ................ H04L 27/2017; H04L 27/34
See application file for complete search history.

(56) References Cited

U.S. PATENT DOCUMENTS 5,825,257 A * 10/1998 Klymyshyn ........ H04L 27/2039
332/100
7,072,414 B1 * 7/2006 Lui ...................... H04L 1/0054
375/274

(Continued)

OTHER PUBLICATIONS

Proakis, John. "Digital Communications (2nd Edition)". McGraw-Hill Publications, New York, 1989. pp. 172-186.

(Continued)

*Primary Examiner* — Jaison Joseph
(74) *Attorney, Agent, or Firm* — Perman & Green, LLP

(57) ABSTRACT

A radio transmission method which includes a steps of simulation of a phase modulation of a radio carrier by the successive transmission of a carrier of a main frequency f and of a carrier of an offset frequency f+Δf, the offset frequency having a frequency difference suitable for simulating a given phase shift of the main frequency at the end of a given time T. The invention further relates to a radio transmission device for implementing the method which includes a radio integrated circuit for generating programmable frequency modulation, means for programming, in this radio integrated circuit, the main frequency f and the offset frequency f+Δf and means for driving this radio integrated circuit in order to generate the frequencies as a function of the signal to be transmitted.

15 Claims, 2 Drawing Sheets

(56) References Cited

U.S. PATENT DOCUMENTS

Figure 1:
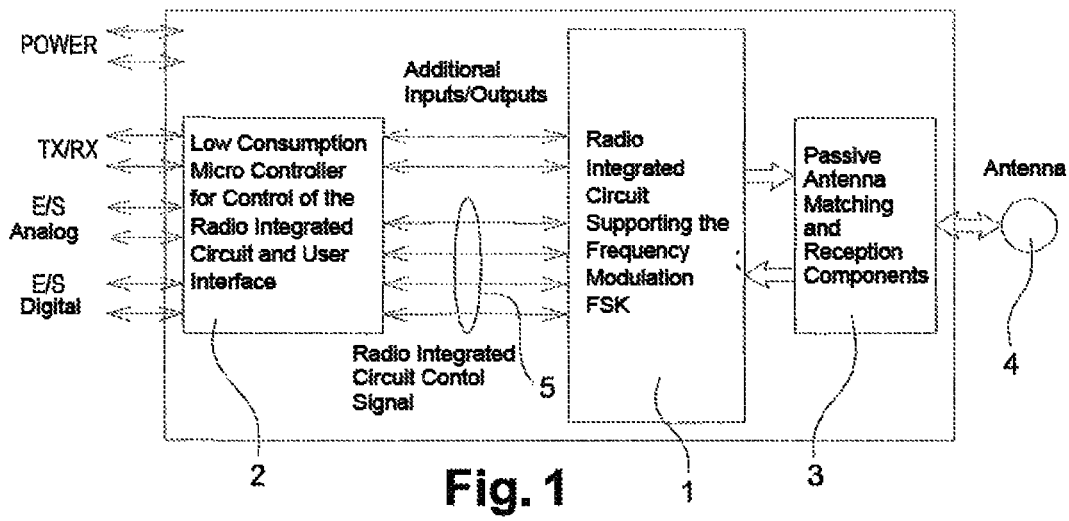

| | | | | |
|---|---|---|---|---|
| 2003/0043950 A1* | 3/2003 | Hansen | ................ | H03C 3/0925 |
| | | | | 375/376 |
| 2005/0276345 A1* | 12/2005 | Norris | ................... | H04L 27/201 |
| | | | | 375/265 |
| 2007/0159260 A1* | 7/2007 | Beyer | ................... | H03L 7/1976 |
| | | | | 331/10 |
| 2010/0310009 A1* | 12/2010 | Lakkis | ................ | H04J 13/0014 |
| | | | | 375/308 |
| 2013/0156083 A1* | 6/2013 | Jechoux | ............. | H04L 27/3809 |
| | | | | 375/224 |

OTHER PUBLICATIONS

Shuguang, et al. "A Mixed-Loop CMOS Analog GFSK Modulator with Tunable Modulation Index". IEEE Transactions on Circuits and Systems II; Express Briefs, vol. 54, Issue 6, Jun. 2007, pp. 547-551.

International Search Report, International Application No. PCT/EP2013/053122, dated Mar. 5, 2013.

\* cited by examiner

RADIO TRANSMISSION METHOD AND ADAPTED RADIO TRANSMITTER

This application is the National Stage of International Application No. PCT/EP2013/053122, having an International Filing Date of Feb. 15, 2013, which designated the United States of America, and which International Application was published under PCT Article 21(2) as WO 2013/121020 A1, and which claims priority from and the benefit of French Application No. 1251447, filed on Feb. 16, 2012.

The presently disclosed embodiment relates to a radio transmission method and an appropriate radio transmitter device and in particular a transmission method and a low bit rate transmitter device for transmitting digital data.

For the production of unlicensed radio systems, notably for the transmission of digital data, the 433 MHz and 868 MHz bands are well suited. They lead to simple and efficient solutions. Well designed, these systems can achieve ranges from several hundreds of meters to a few kilometers.

These bands are shared by multiple users which therefore limits the transmission power and their temporal usage rate.

The FM and AM modulations, or a combination of the two, are used by all the players to manufacture transmission systems in these frequency bands. All the existing integrated circuits therefore offer these modulation systems.

There are in particular transmission systems suitable for constructing networks that are notably applicable to the transmission of low bit rate data, such as data from sensors embedded in gas or other meters, system surveillance data or similar.

These data transmitted by stand-alone stations are recovered and processed by a remote data collection equipment item.

One transmission principle suitable for such applications is for example a binary phase modulation called PSK (phase shift keying) modulation.

However, one problem is that the radio integrated circuits on the market do not incorporate the phase modulation.

Phase modulation is a standard modulation system with no particular complexity.

There are a number of methods for producing a phase modulation:
a. applying the modulating signal to an LC or RC phase shift; variable capacitance diodes are generally used to produce this function,
b. adding two carriers in quadrature, after having modulated each of them in amplitude. If the amplitude modulating signals are correctly chosen, the composition of the two duly modulated carriers gives a phase modulated carrier with constant amplitude. This type of modulation is called "I-Q",
c. taking the derivative of the modulating signal and applying this differentiated signal to a frequency modulator.

To use such a modulation, it is therefore currently necessary to use a frequency generator and to produce the phase modulation by external components, which is costly and takes up significant space on the printed circuit of an equipment item.

Furthermore, in the case of a binary phase modulation, a circuit with analog external components can lead to amplitude differences between the binary 1 state and the binary 0 state, which would have to be adjusted in production if these differences were problematical for the receiver.

To resolve the problem of the binary phase modulation, the device of the presently disclosed embodiment relies on means suitable for simulating a phase modulation of a radio carrier by the successive transmission of a main frequency and of an offset frequency, the offset frequency having a frequency difference suitable for simulating a given phase shift of the main frequency at the end of a given time.

For this, the disclosed embodiment proposes a radio transmission method and device suitable for simulating a phase modulation of a radio carrier for the transmission of binary data.

More specifically, the disclosed embodiment proposes a radio transmission method which comprises steps of simulation of a phase modulation of a radio carrier by the successive transmission of a carrier of a main frequency f and of a carrier of an offset frequency f+$\Delta$f, the offset frequency having a frequency difference suitable for simulating a given phase shift of the main frequency at the end of a given time T.

Advantageously, the simulation consists in modifying $\omega^*t=2\pi f^*t$ in which f represents the frequency of the carrier so as to vary the instantaneous phase of the carrier signal.

In the case where the modulation is a binary phase modulation, the given time T is the time that makes it possible to produce a phase shift of $\pi$ compatible with a detection by a receiver.

Advantageously, the method comprises at least one step of generation of the base carrier f, at least one step of generation of the offset carrier f+$\Delta$f, at least one step of transmission of the offset carrier for the time needed for a phase shift of $\pi$ after transmission of the base carrier f and at least one step of return to the base carrier.

According to a particular aspect, the method comprises at least one amplitude modulation step during the frequency variation phases.

During the amplitude modulation step, the transmission level is advantageously modified in a Gaussian or sinusoidal manner to avoid the abrupt changes of amplitude and limit the spectrum of the modulated signal.

According to a particular aspect, the method comprises the generation of a modulation of GFSK, Gaussian frequency shift key, type, comprising a Gaussian filter, and the application of a change of frequency from f to f+$\Delta$f for a time T/2 and a change of frequency from f+$\Delta$f to f for the same time T/2.

The disclosed embodiment further relates to a radio transmission device for implementing the method of the disclosed embodiment which comprises a radio integrated circuit for generating modulation of programmable frequency hereinafter called radio integrated circuit, means for programming, in this radio integrated circuit, the main frequency f and the offset frequency f+$\Delta$f and means for driving this radio integrated circuit so as to generate said frequencies as a function of the signal to be transmitted.

The driving means advantageously drive the radio integrated circuit in real time to generate the offset frequency according to times suitable for simulating a change of phase of the main frequency in relation to a modulation to be transmitted.

The device is preferably produced by the association of a radio integrated circuit supporting the frequency modulation and of a micro controller comprising said means for driving the radio integrated circuit.

Preferably, the micro controller comprises means for writing, in registers of the radio integrated circuit, a frequency f, a frequency f+$\Delta$f and a transmission binary transfer rate, the radio integrated circuit comprising frequency switching means associated with said registers.

Advantageously, the micro controller comprises means suitable for producing a coding of the binary data to be transmitted, transferring the coded data to the radio integrated circuit, and in that the radio integrated circuit comprises means suitable for generating and transmitting the base frequency f and the offset frequency f+Δf in accordance with the coding of the coded data, such that the offset frequency is transmitted for the time needed for a phase shift of π after transmission of the base frequency f for each transition from 0 to 1 or from 1 to 0 of the binary data, the base frequency f being transmitted for as long as the data do not change value.

According to an advantageous aspect, the radio transmission device comprises means for generating an amplitude modulation during the frequency variation phases.

The means for generating the amplitude modulation advantageously comprises, in the radio integrated circuit, means for controlling its transmission level and, in the micro controller, means for driving, by the micro controller, said control means, the micro controller driving this level as a function of the change of frequency.

According to a particular aspect, the control means and the driving means are suitable for driving the transmission level in a Gaussian or sinusoidal manner to avoid the abrupt changes of amplitude and limit the spectrum of the modulated signal.

According to a particular aspect, the means for generating the amplitude modulation comprise means for driving, by the micro controller, the bias voltage of the transmission signal of a circuit external to the radio integrated circuit or directly in one or more registers of the radio integrated circuit.

According to an advantageous aspect, the device comprises means for generating a modulation of GFSK type comprising a Gaussian filter, and suitable for applying a change of frequency from f to f+Δf for a time T/2 and a change of frequency from f+Δf to f for the same time T/2.

Advantageously, the bit rate of the transmitting integrated circuit is set at a value higher than the transmission bit rate, additional bits being transmitted to complete the transmission bit time.

According to a particular aspect, the micro controller adapts the frequency in real time between f and f+Δf by writing, in one or more registers of the radio integrated circuit, capacitance value data for controlling the frequency of a quartz crystal linked to the radio integrated circuit.

Figure 3A:
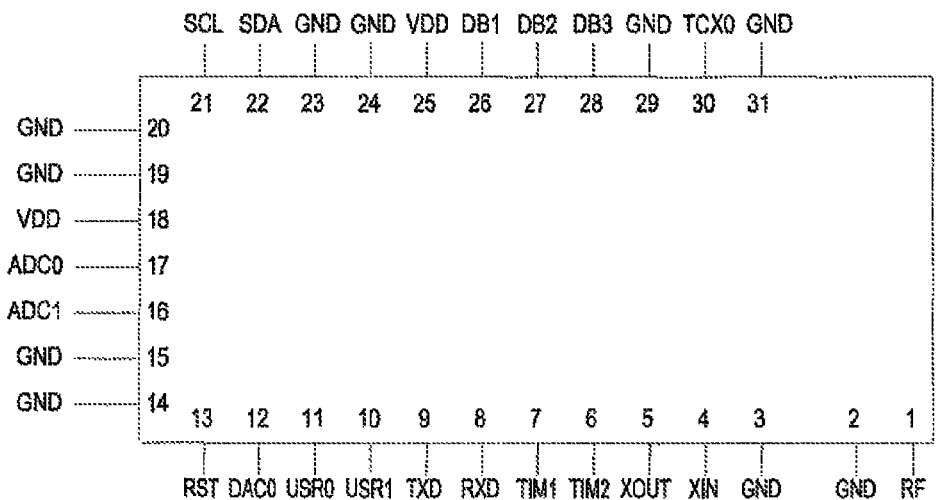
Figure 3B:
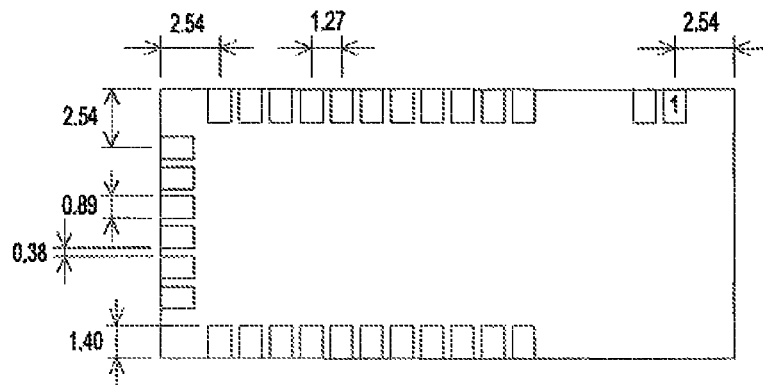
Figure 2:
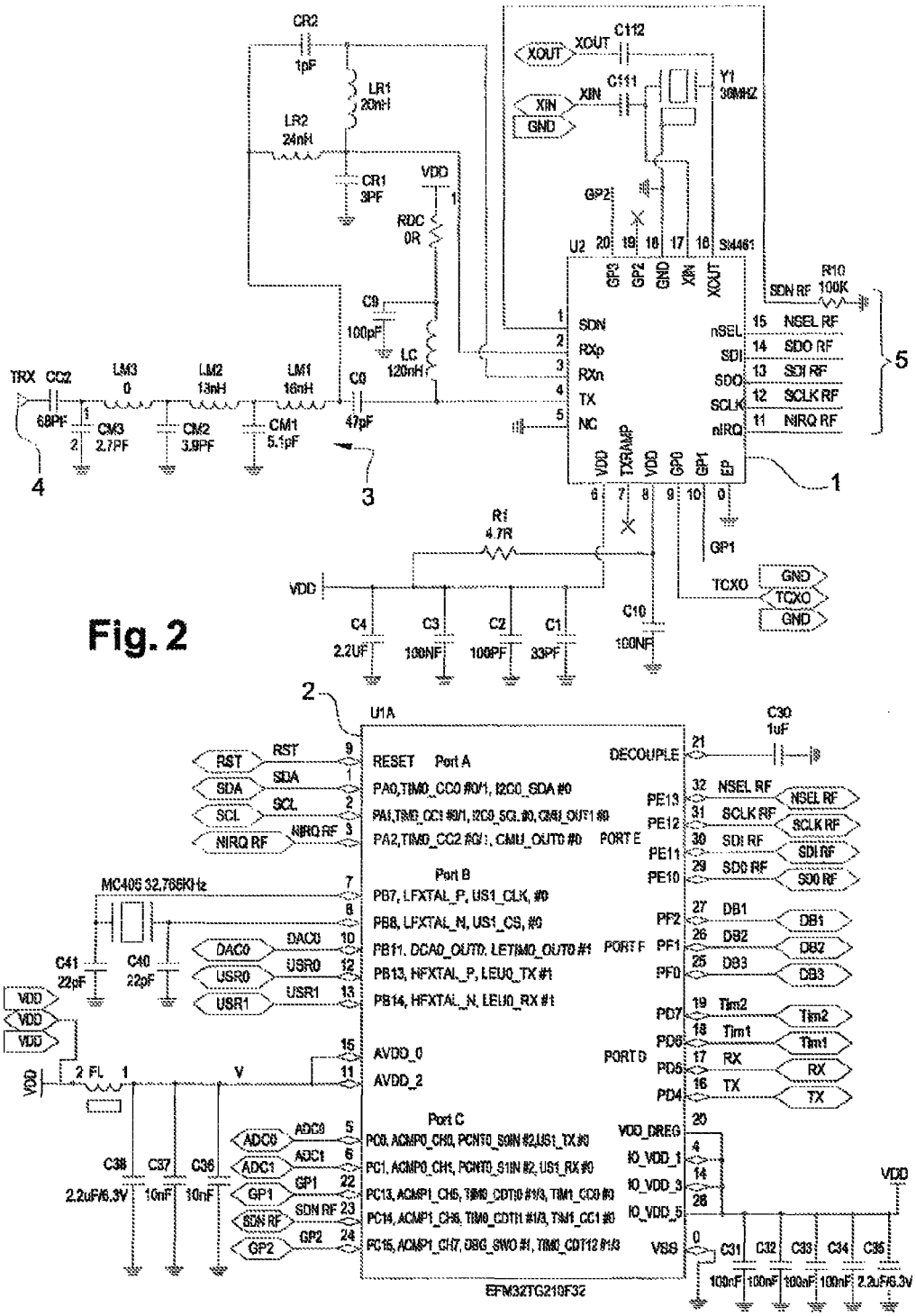

Other features and advantages of the disclosed embodiment will become apparent on reading the following description of a non-limiting exemplary aspects of the disclosed embodiment with reference to the drawings which represent:

in FIG. 1: a block diagram of an exemplary aspect of the device of the disclosed embodiment;

in FIG. 2: a detailed diagram of an exemplary aspect of the device of FIG. 1;

in FIGS. 3A and 3B: respectively, an input/output diagram and a layout diagram of a module reprising the device of FIG. 1.

According to the exemplary aspect of FIG. 1, the device is produced by the association of a radio integrated circuit 1 supporting the frequency modulation and of a low consumption micro controller 2 driving said radio integrated circuit.

The radio integrated circuit is linked to an antenna 4 via passive antenna matching and reception components 3.

In the example represented corresponding to an aspect of the disclosed embodiment which relates in a non limiting manner to a transmitter produced in the 868 MHz band, the system remains totally in accordance with the design rules proposed by the radio integrated circuit manufacturer. No other component other than the antenna matching and reception components are added.

In the context of the disclosed embodiment, the modulation is advantageously a binary phase modulation, the given time T being the time chosen to produce a phase shift of π compatible with the detection of a change of binary state by a receiver with detection of phase modulation, in particular PSK.

For example, for a detector which measures the phase at the end of a bit time for a bit rate of 100 bits/s, the maximum time T is 10 ms, for a receiver sampling the phase after ½ bit time, the time is no more than 5 ms.

A radio frequency carrier can be represented by the following expression:

$Vf(t)=A \cos(\omega.t+\phi(t))$ in which the instantaneous phase is given by $\Omega(t)=\omega.t+\phi(t)$.

The traditional phase modulation principles apply a modulating signal m(t) to the phase $\phi(t)=Kp.m(t)$ in which m(t) represents the modulating signal and Kp a constant.

To vary the instantaneous phase of the carrier signal, according to the presently disclosed embodiment, the device comprises means suitable for modifying $\omega.t=2\pi f.t$ in which f represents the frequency of the carrier.

If we increase the carrier frequency by a value Δf, this will lead to a variation of the phase as a function of time. If the new frequency f1 is equal to f+Δf, the resultant phase will be equal to the initial phase plus a variation equal to $2\pi\Delta f.t$.

In the case of a binary phase modulation, the phase variation has to be ±180° (±π), or even (2n+1) times (±π).

Hence the expression $2\pi.\Delta f.t=(2n+1).\pi$.

$\Delta f=(2n+1)/(2t)$ For example, a frequency variation of 200 Hz for 2.5 ms will lead to a phase shift of π, the value desired in a binary phase modulation. For n=1, a variation of 600 Hz, for 2.5 ms, leads to a variation of 3π, therefore identical to π. The greater the frequency of deviation, the more extensive the spectrum of the resultant signal. The objective is therefore to use a frequency variation that is as small as possible to obtain the best spectrum. Hence the objective of taking a minimum $\Delta f=1/(2t)$.

To generate the binary phase modulation, the device of the disclosed embodiment comprises means suitable for generating a base carrier f and an offset carrier f+Δf and for transmitting the offset carrier for a time t=1/Δf after the transmission of the base carrier f then for reverting to the base carrier.

The principle of the disclosed embodiment is applied by diverting market-standard integrated circuits designed to produce frequency modulation from their function. These integrated circuits basically incorporate the possibility of pre-programming the two frequency modulation frequencies desired here and of generating them as a function of the modulating signal:

For example "1"=f and "0"=f+Δf, or the reverse.

For this, the radio transmission device of the disclosed embodiment is such that the means comprise a radio integrated circuit for generating binary modulation of programmable frequency, means for programming, in this radio integrated circuit, the main frequency f and the offset frequency f+Δf and means for driving this radio integrated circuit in order to generate said frequencies as a function of the signal to be transmitted.

According to the example in which Δf=200 Hz, by correctly choosing the radio integrated circuit, it becomes possible for us to program the two frequencies F0=868 MHz carrier frequency and F1=F0+200 Hz and, according to the presently disclosed embodiment, use them consecutively to create the phase modulation.

Under the action of the driving means, the radio integrated circuit generates the offset frequency according to times suitable for simulating a change of phase of the main frequency in relation to the modulation to be transmitted.

Notably, in the case of a low bit rate application and, for example, an application in which the transmission speed is 100 bits/s, i.e. 10 ms per bit, we choose a time of 2.5 ms which is very well suited. If the desired modulation has to be faster, it is sufficient to increase the frequency $\Delta f$ and reduce the frequency change time.

The programming of the radio integrated circuit will then comprise the programming of the registers corresponding to the two frequencies f and f+$\Delta f$, the programming of the transmission bit rate of the radio integrated circuit followed by the sending of the binary words that are to be transmitted.

It is important to note that the width of the resulting spectrum depends on the modulating signal. The Carlson rule makes it possible to bear out that the greater the frequency deviation $\Delta f$, the wider the spectrum.

It is therefore necessary to try to take the smallest possible frequency deviation to reduce the spectrum of the modulated signal.

Based on the reception systems and, primarily, on the principle of analysis of the change of phase, this frequency variation will be able to be modified. For example, if the receiver detects the change of phase at the end of the bit time, for example ms, a $\Delta f$ of 50 Hz could be used if the radio integrated circuit permits it. This limits even further the bandwidth of the modulated signal which is beneficial.

The principle described previously can be adapted according to the networks and the associated receivers. The choice of the radio integrated circuit and of the frequency deviation that it allows will make it possible to adapt to these different configurations.

Still in the interests of reducing the spectrum of the modulated signal, according to a particular aspect of the disclosed embodiment, a modulation of GFSK, Gaussian Frequency Shift Key, type is advantageously used to simulate a GPSK, Gaussian phase shift key, transmission.

The interest is not to abruptly change from a frequency f to a frequency f+$\Delta f$. The change of frequency is made progressively following a conventional Gauss curve.

A Gaussian filter results in a phase shift of $\pi/2$ during the preceding time T. For this, the device of the disclosed embodiment advantageously comprises means for generating a modulation of GFSK type, and suitable for applying a change of frequency from f to f+$\Delta f$ during a time T/2 and a change of frequency from f+$\Delta f$ to f during the same time T/2 to obtain the phase shift of $\pi$ at the end of the time T corresponding to the phase change detection delay of the receiver.

The total phase shift will be at least $\pi$. By contrast, the time to obtain the phase shift $\pi$ will be doubled. In the case of a bit rate of 100 bits/s, 10 ms period, the change of phase of $\pi$ will therefore be applied at the end of 2*2.5 ms, or 5 ms, for a $\Delta f$ of 200 Hz. As stated previously, based on the receivers, it will be possible to adapt the $\Delta f$ to the use or non-use of the Gaussian filter.

It is possible here to use the Gaussian filter of the radio integrated circuit in the case where the latter is equipped therewith. To return to the principle of driving of the radio integrated circuit, the useful transmission bit rate is the number of bits sent per second to the receiver.

For example, in the case of a bit rate of 100 bits/s, there is a possible change of bit every 10 ms.

It is desirable, to conform to the specifications of the receiver, for the phase shift of TC to be produced in ½ a bit time, so it will be necessary for it to be produced at the end of a maximum of 5 ms.

In Gaussian terms, this means, 200 Hz, but that is applied in two steps, each leading to a phase shift of
$\pi/2$.

Therefore the individual time is 2.5 ms for each of the phase shifts. 2.5 ms corresponds to a bit rate of 400 bits/s.

The bit rate of the radio circuit is therefore set at 400 bits/s and not 100 bits/s.

Similarly, the transfer between the micro controller and the radio circuit is programmed at 400 bits/s.

To transmit a 1, it is necessary to send a 1 which leads to a $\Delta f$ and therefore a phase shift of $\pi/2$, send a 0 which returns to f and which also leads to a phase shift of $\pi/2$ then more change, the 0 is maintained for the remaining 5 ms.

To sum up, for a change from 0 to 1 or from 1 to 0, therefore where a phase shift of $\pi$ is desired, the same code 1000 will be sent between the microcontroller and the radio circuit. 4 bits at 400 bits/s for a bit change at 100 bits/s.

If we had done FSK, with the same conditions, 1000 at 400 bits/s, the same result is obtained but in 2.5 ms.

If the phase shift is desired at 5 ms, 200 bits/s is used (5 ms), and in this case 10 is sent for a change from 0 to 1 or from 1 to 0.

The transmission bit rate of the radio circuit therefore depends on the $\Delta f$.

According to this principle, the bit rate of the transmitter integrated circuit is set at a value higher than the transmission bit rate, in the first case 4× and in the second case 2× the transmission bit rate, additional bits being transmitted to complete the transmission bit time. Generally, the bit rate of the transmitter integrated circuit is, preferably, a multiple of the transmission bit rate. The bit rate between the micro controller and the radio integrated circuit is also increased in the same way to send frames.

For the driving of the radio integrated circuit, the link between the micro controller 2 and the radio integrated circuit 1 is, for example, a bus 5 of I2C or SPI type used for example in a radio integrated circuit of the type from the series si446x from the American company Silicon Laboratories Inc.

The SPI bus is a synchronous serial databus, thus named by the company Motorola, and which operates in full-duplex mode. The circuits linked by means of this link communicate according to a master-slave scheme, in which the master manages all of the communication.

The SPI bus contains 4 logic signals, often called SCLK Clock generated by the master, SDO/SDI input/output, the SDO output of the master being linked to the SDI input of the slave and vice versa, and SS Slave Select or NSEL, active in the low state, signal generated by the master during the communication with the slave.

In FIG. 2, the top part of the diagram is the radio part, the bottom part the micro controller part.

The micro controller 2 comprises input/output ports PAn to PFn enabling it notably to receive binary data and comprises a TTL serial port, Port I2C, high or low level active inputs/outputs with or without pull-up.

It comprises means for performing analog/digital conversion ADC0, ADC1, digital/analog conversion DAC0 on the inputs/outputs PC0 and PC1 and means for managing the radio integrated circuit on the inputs/output PE10-PE13, PC14 and PA2.

The interface between the radio integrated circuit and the processor/micro controller comprises the links SDO_RF, SDI_RF, SCLK_RF and NSEL_RF, control signals for the radio integrated circuit in the block diagram, and which are connected between the radio integrated circuit 1 and the micro controller 2 and correspond in the present case to the SPI bus signals.

This interface further comprises an interrupt signal NIRQ, RF, the links GP1 and GP2 called additional inputs/outputs which make it possible to configure or exchange data with the radio integrated circuit and a link SDN_RF which makes it possible to switch the radio integrated chip on or off.

To implement the device of the disclosed embodiment, the micro controller 2 is programmed notably to: manage the radio integrated circuit 1, the communication with the electronic system using the input/output device USR0, USR1, RST, SDA, SLC for example, the parameterizing of the communication protocol to be used and possibly the translation of input values into binary words to be transmitted. Then, to initialize the radio link, a parameterizing of the radio integrated circuit 1 is performed by means of the micro controller 2.

The programming of the micro controller 2 is done according to the specific features of this component and according to the methods known to those skilled in the art.

For its part, the radio part comprises the radio integrated circuit 1, the quartz crystal Y1 defining the basic operating frequency of the radio integrated circuit, the components for coupling the transmission output TX with the antenna 4 and the typical circuits for the operation of the integrated circuit 1.

For the communication with the radio integrated circuit, the micro controller programmes in particular the registers of the radio integrated circuit or RF 1 managing the transmission levels, the transmission frequency f, the transmission frequency f+Δf and the transmission bit rate.

The operation of the device then mainly comprises the reception by the micro controller of the binary values to be transmitted or the computation of these value as a function of the data or measurement values received by the micro controller on its inputs, the translation by the latter of these values into binary words according to the communication protocol programmed in the micro controller; the translation of these words into a series of frequency changes suitable for simulating the change of phase, the driving of the radio integrated circuit by the micro controller to produce these frequency changes according to the timing defined in the micro controller in order to transmit the binary words and the frames of the protocol.

As seen previously the change of frequency is used to simulate the change of phase.

The time during which the frequency f+Δf is transmitted is therefore the time necessary for the receiver to detect a phase variation of $\pi$ and recognize a change of the data from 0 to 1 or from 1 to 0 depending on the case.

The micro controller and the radio integrated circuit are therefore programmed as a function of the frequency f+Δf and of the type of detection of the receiver to transmit this frequency for the time necessary for the receiver to recognize the change of phase.

At the transmission level, the frequency deviation parameters are important to be able to minimize the resulting frequency bandwidth. Integrated circuits with deviations of 50 Hz exist on the market. In the case of the application where the transmission speed is 100 bits/s, or 10 ms per bit, and where the receiver detects the change of phase at the end of the bit time, these integrated circuits make it possible to produce a phase shift of 180° at the end of 10 ms.

According to a particular aspect based on the radio integrated circuit si4461 from the abovementioned series, the device of the disclosed embodiment is a module having a range of frequencies of =142-1050 MHz, its modulation can be of the (G)FSK, 4(G)FSK, GMSK, OOK, ASK type, its dimensioning represented in FIG. 3B is of the "Land Grid Array Package" LGA31(25.4*12.7*2.54 mm) type.

According to a particular aspect of the disclosed embodiment, to further improve the spectrum of the resulting signal and therefore reduce the bandwidth used, an amplitude modulation is produced at the same time as the frequency variation phases and the device advantageously comprises, for this, means for generating an amplitude modulation during the frequency variation phases.

This modulation will be able to be performed in two ways:

a. in the case of a radio integrated circuit 1 making it possible to rapidly and finely adjust the transmission level between a zero value and the desired maximum value, the associated microcontroller 2 will modify this level preferably synchronously with the change of frequency by writing into the corresponding registers of the radio integrated circuit increasing then decreasing level values. This change of amplitude will be applied, if possible, in a Gaussian or sinusoidal manner to avoid the abrupt changes of amplitude still in order to limit the spectrum of the modulated signal.

In this solution, the micro controller drives, in real time, the transmission level of the radio integrated circuit during the transmission of the data by writing into the registers of the radio integrated circuit managing the transmission level.

b. if this operation is difficult to produce with the radio component used, the choice is focused on a modification of the bias voltage of the transmission signal directly by changing the output voltage of the output amplifier of the radio integrated circuit by driving, for example by a transistor or a digital/analog converter controlled by the micro controller, the bias voltage $VDD_1$ applied at the output TX through the resistor RDC and the inductor LC. This voltage must vary between the maximum value to obtain the maximum transmission level and a zero value during the change of frequency. In physical terms, in the case of a frequency variation in Gaussian mode, the voltage or the amplitude will be zero at the end of 2.5 ms in the case of our 200 Hz variation and will be once again at its maximum after 5 ms.

A variant that can be used to resolve the technical problem of the variation of the frequency to simulate the phase modulation, and therefore produce the Δf, consists in varying the operating frequency of the radio integrated circuit on its clock quartz crystal.

This is possible in the case of radio integrated circuits which incorporate the foot capacitances to adjust the frequency of the quartz crystal accurately. The value of these foot capacitances controlled by an internal register of the radio integrated circuit.

These capacitances are very accurate and, in the context of the disclosed embodiment and therefore of a low bit rate transmission which allows sufficient time to vary the parameters of the radio integrated circuit, it is possible to modify, in real time, the value of the foot capacitances to deflect the frequency of the quartz crystal by a ratio that would make it possible to deflect the carrier frequency.

For example, with a quartz crystal Y1 at 26 MHz, and not 30 MHz as in FIG. 2, to obtain 868 MHz, the ratio is 33.3846, in the context of the low bit rate transmission of the invention, to obtain a variation of 200 Hz on 868 MHz, a variation of 200/33.3846=6 Hz is needed.

In the case of the radio integrated circuit of the abovementioned si4460 type, the integrated capacitances have a variation pitch of 0.1 pF which allows for a variation of 6 Hz by starting from the base frequency of 26 MHz and the ratio concerned.

The values of the integrated capacitances are changed by sending commands from the micro controller to the radio integrated circuit through the SPI interface between the radio integrated circuit and the micro controller.

The values are modified by writing dedicated registers in this radio integrated circuit, the radio integrated circuit switching the corresponding capacitance values according to whether is or 0s have to be sent.

In the electrical diagram of FIG. 2, the quartz crystal is identified by Y1.

The two foot capacitances are integrated in the radio integrated circuit, one internally connected to XIN and the other internally connected to XOUT.

It is these two capacitances which are modified to adjust the frequency of the quartz crystal and produce the change of frequency.

It should be noted that, in the diagram of FIG. 2, the external capacitances C111 and C112 are not used.

In this solution, the micro controller writes into the registers of the radio integrated circuit managing the foot capacitances during the transmission of the data.

The device and the method of the disclosed embodiment apply notably to data transmissions from networks of sensors, of medical parameter monitor devices, of remote control devices, of building security and alarm devices, of range finding and industrial control, low bit rate applications which exploit the small bandwidth used by the data transmission mode of the disclosed embodiment.

Its micro controller, for example of Cortex M3 type, enables it to be adapted to trade networks. The combination of a radio integrated circuit and of a micro controller makes it possible to handle complex protocols and inputs from sensors whose data are directly translated by the micro controller and sent by the radio integrated circuit.

According to FIGS. 3A and 3B, the device is produced on the basis of a module of small dimensions to allow for simple integration by the end users. The dimensions currently provided are 25.4 mm×12.7 mm*2.54 mm (L*l*h).

The presently disclosed embodiment can be produced with numerous transmitter radio integrated circuits designed to transmit in FSK or GFSK mode of which the presently disclosed embodiment diverts the functions to simulate a transmission with phase modulation.

What is claimed is:

1. A method for generating a radio signal in a radio emitter, wherein said method comprises steps of generating, with a programmable frequency modulation generation integrated circuit, a radio carrier signal having a main frequency f and an offset frequency f+Δf and a step of providing phase modulation of said radio carrier signal by the successive generation and transmission of said main frequency f and said offset frequency f+Δf, the offset frequency having a frequency difference suitable for simulating a given phase shift of the main frequency at the end of a given time T; and wherein the modulation is a binary phase modulation, the given time T being the time needed to obtain a phase shift of $\pi$ that can be detected by a receiver receiving the signal, said method comprising further at least one step of generating a signal with the base frequency f, at least on step of generating a signal having the offset frequency f+Δf, at least one step of transmitting the signal with the offset frequency for the time needed for a phase shift of $\pi$ after transmission of the signal with the base frequency f and at least one step of return to the signal with the base frequency f when the phase shift of $\pi$ is obtained.

2. The method as claimed in claim 1, wherein the modulation consists in modifying $\omega^* t = 2\pi f^* t$, in which f represents the frequency of the carrier and modifying the instantaneous phase of the carrier signal.

3. The method as claimed in claim 1, further comprising at least one amplitude modulation step during the frequency variation phases.

4. The method as claimed in claim 3, wherein, during the amplitude modulation step, the transmission level of the signal is modified in a Gaussian or sinusoidal manner to avoid abrupt changes of amplitude and limit the spectrum of the modulated signal.

5. The method as claimed in claim 1, further comprising the generation of a modulation of GFSK, Gaussian frequency shift key, type, comprising a Gaussian filter, and the application of a change of frequency from f to f+Δf for a time T/2 and a change of frequency from f+Δf to f for the same time T/2.

6. A radio transmission device for implementing the method of claim 1, comprising the programmable frequency modulation generation radio integrated circuit, means for programming, in this radio integrated circuit, the main frequency f and the offset frequency f+Δf, and means for driving this radio integrated circuit so as to generate said frequencies as a function of the signal to be transmitted and wherein the driving means drive the radio integrated circuit to generate the offset frequency according to periods of time suitable for stimulating a change of phase of the main frequency in relation to a modulation to be transmitted.

7. The radio transmission device as claimed in claim 6, wherein the radio integrated circuit supporting the frequency modulation and a micro controller comprising said means for driving the radio integrated circuit are associated with each other, wherein said micro controller comprises means for writing, in registers of said radio integrated circuit, a frequency f, a frequency f+×f and a transmission binary transfer rate, the radio intergrated circuit comprising frequency switching means associated with said registers.

8. The radio transmission device as claimed in claim 7, wherein said micro controller comprises means suitable for producing a coding of the binary data to be transmitted, transferring the coded data to the radio integrated circuit, and in that the radio integrated circuit comprises means suitable for generating and transmitting the base frequency f and the offset frequency f+Δf in accordance with the coding of the coded data, such that the offset frequency is transmitted for the time needed for a phase shift of $\pi$ after transmission of the base frequency f for each transition from 0 to 1 or from 1 to 0 of the binary data, the base frequency f being transmitted for as long as the data do not change value.

9. The radio transmission device as claimed in claim 6, further comprising means for generating an amplitude modulation during the frequency variation phases.

10. The radio transmission device as claimed in claim 9, wherein the control means and the driving means are suitable for driving the transmission level in a Gaussian or sinusoidal manner to avoid abrupt changes of amplitude and limit the spectrum of the modulated signal.

11. The radio transmission device as claimed in claim 9, wherein said means for generating the amplitude modulation comprise, in the radio integrated circuit, means for controlling a transmission level and, in the micro controller, means for driving means for controlling a transmission level, the micro controller driving said transmission level as a function of the change of frequency.

12. The radio transmission device as claimed in claim 9, wherein said means for generating the amplitude modulation comprise means for driving, by the micro controller, a bias voltage of the transmission signal on a circuit external to the radio integrated circuit or directly in one or more registers of the radio integrated circuit.

13. The radio transmission device as claimed in claim 6, further comprising means for generating a modulation of the GFSK type comprising a Gaussian filter, and suitable for applying a change of frequency from f to f+Δf for a time T/2 and a change of frequency from f+Δf to f for the same time T/2.

14. The radio transmission device as claimed in claim 6, for which the bit rate of the transmitting integrated circuit is set at a value higher than the transmission bit rate, additional bits being transmitted to complete the transmission bit time.

15. The radio transmission device as claimed in claim 6, wherein the micro controller adapts the frequency in real time between f and f+Δf by writing, in one or more registers of the radio integrated circuit, frequency control capacitance value data for a quartz crystal linked to the radio integrated circuit.

* * * * *